Patented Jan. 6, 1948

2,434,190

UNITED STATES PATENT OFFICE 2,434,190

PURIFICATION OF FLUIDS WITH SILVERED RESINS

Robert Bowling Barnes, Stamford, and Garnet Philip Ham, Old Greenwich, Conn., assignors to American Cyanamid Company, New York, N. Y., a corporation of Maine No Drawing. Application October 13, 1942, Serial No. 461,901

4 Claims. (Cl. 210—24)

This invention relates to processes for destroying microorganisms in fluid media.

The oligodynamic metals, such as silver and copper, have been used as bactericides but this is not feasible in many cases because of the fact that the concentrations required would be toxic if taken internally by humans in the form of drinking water or in the forms of other liquids sterilized in this manner. Many experiments have been conducted wherein silver in the metallic form which is relatively insoluble in water has been employed. Some of these experiments have resulted in a fair degree of success but the activity of the silver metal has been so low that practical usage was not feasible. Furthermore, the silvered metals previously employed such as silvered sand, do not exhibit sufficient activity to safely sterilize polluted water in anything like a short period of time. When such metals are employed a very long time is required to even approach complete sterilization.

An object of this invention is to provide a process for destroying microorganisms by the use of oligodynamic metals in a highly activated form.

Another object of this invention is to provide a process for killing bacteria with excellent efficiency.

A further object of my invention is to provide improved germicidal processes.

These and other objects are attained by treating a fluid medium containing germs with an anion active resin which has an oligodynamic metal such as silver precipitated thereon and bound with the resin. The silver or other oligodynamic metal may be precipitated on and bound with the anion active resin by contacting the latter with a solution of a salt of the silver or other metal and optionally the silver may be reduced to the metallic state by any suitable process.

The following examples in which the proportions are in parts by weight except when otherwise stated are given by way of illustration and not in limitation.

EXAMPLE 1

Preparation of silvered resin

About 100 cc. of anion resin "A" is packed into a column about ¾ inch in diameter. The resin is activated by treatment with a dilute solution of an alkaline material, e. g., a 2% solution of sodium carbonate in water and the resin is washed with water until the pH of the effluent is between about 9 and 11. The column is shielded from the light to prevent photo-reduction of the silver during the succeeding treatment. A dilute solution of silver nitrate (for example 0.1 M.) is passed through the column until substantially no silver is removed from the solution. About 450 cc. of 0.1 M. silver nitrate solution is required. Any excess of solution is removed from the treated resin. This may be accomplished by subjecting the resin to a vacuum and by extracting the resin with water and finally with distilled water until no silver is found in the effluent. The resin may be used in this form or it may be dried by any suitable means such as by subjecting it to a vacuum. The silvered resin is dark brown to black in color. The silvered resins generally contain approximately 8.5% of silver calculated as the metal when made in this manner.

Other methods such as direct slurrying of the resin body with the reagent yield products having a silver content varying from about 0.1% to about 12% or more.

The silvered resin may be formed into tablets either with or without a suitable binding agent in order to have the resin in a convenient form which facilitates the use of the desired amount of material.

About 1 gram of the resin described above is placed in a drinking glass containing about 120 cc. of water containing about 218 colonies per cc. of B. coli. After agitating the resin in the water for about 10 minutes it was found that the water was substantially free of bacteria.

EXAMPLE 2

Preparation of reduced silvered resin

A resin prepared in accordance with Example 1 is slurried in an aqueous solution containing about 5–10% of potassium metabisulfite. The solution is rendered acid by the addition of a very small amount of concentrated hydrochloric acid, and the solution warmed to about 50° C. At this point sulfur dioxide is slowly evolved. The temperature of the solution is allowed to drop to room temperature and after standing for several hours the resin is filtered and washed with water until the effluent contains no silver or sulfur compounds. The resin is now ready for use as a bactericide in the treatment of water or other fluid media. If desired, the resin may be dried and/or formed into tablets. Microscopic examination of the resin shows that a large proportion of the resin particles are coated with metallic silver.

This resin may be used to purify water in the manner described in Example 1, similar results being obtained.

EXAMPLE 3

Into a small paper or cloth bag such as that used for tea, about 2 grams of a silvered resin prepared according to Example 1 are placed. The bag is immersed in a glass containing about 250 cc. of water which contains more than 100,000 colonies per cc. of *B. coli*. After standing for about 5 minutes with thorough agitation the water is found to be free of *B. coli*.

EXAMPLE 4

Four tablets, each containing 0.4 gram of silver-treated resin prepared according to Example 1, are dropped into a vessel containing about 550 cc. of water which has about 400 colonies per cc. of *B. coli*. The vessel is agitated for about 1 minute causing the tablets of resin to disintegrate during the first 15 seconds. After this treatment the water is found to be free of bacteria.

EXAMPLE 5

About 1 gram of the resin prepared according to Example 1 is thoroughly agitated for about 5 minutes in 1 liter of water containing about 72,500 colonies per cc. of *B. coli*. No *B. coli* was found in the water after this treatment. This test shows the high bactericidal activity which our silver-treated resins possess. Furthermore, it is estimated that the silver content of the treated water is not greater than 20 P. P. M.

If, instead of one gram of resin, only 0.01 gram of resin be used, the water is found to contain about 5800 colonies per cc. of *B. coli* after only 5 minutes of treatment. In this instance the entire resin employed contains only 1 P. P. M. of silver to the liter of water. Since a very small proportion of this silver is dissolved in the water, the silver content of the treated water would be only a fraction of 1 P. P. M. and therefore so small that it cannot easily be determined accurately.

EXAMPLE 6

The high efficiency of our compositions as compared, for example, to similar materials prepared from cation active materials is illustrated in this example. Anion active resin "A," a carbonaceous zeolite and an extremely active synthetic resin prepared by resinifying furfural acetone sulfonate with furfural (designated below as resin "C") were treated for 30 minutes with a 0.04 M. solution of silver nitrate. Similar tests on each of these silvered resins were carried out by thoroughly agitating 0.1 gram of resin per liter of a bacterial suspension containing about 50,000 colonies per cc. of *B. coli*. Equal proportions of each of the resins were agitated in portions of the suspension for the times shown in the table by means of an agitator running at approximately 100 R. P. M. After agitation for the designated periods of time, samples of the suspensions were withdrawn and cultivated on nutrient agar for 24 hours at 37° C., after which they were examined bacteriologically. The results of these tests are shown from the following table:

| Time in Minutes | Resin "A" | Resin "C" | Carbonaceous Zeolite |
|---|---|---|---|
| 1 | 4,200 | 35,200 | 22,200 |
| 5 | 8,100 | 21,400 | 9,200 |
| 30 | None | 18,000 | 500 |
| 120 | None | 800 | 200 |
| Estimate of Silver in Suspension After Removal of Resin P. P. M. | 0.5 | 0.05 | 0.1 |

The foregoing table also shows that an estimate of the silver contained in the suspension after the resin is removed is much greater if our silvered resins be employed as compared to that obtained if a silvered cation resin be used.

EXAMPLE 7

About 2 grams of the resin prepared according to Example 1 are placed on a filter paper contained in a funnel. A bacterial suspension containing more than 100,000 colonies per cc. of *B. coli* is poured through the resin on the filter paper. A bacteriological examination of the first 75 cc. fraction showed that the bacterial content had been reduced to 100 colonies per cc. whereas an examination of the next 25 cc. fraction showed that all of the bacteria has been killed.

We have found that it is desirable that good agitation of the liquid and resins be provided. Thus, under similar conditions, with no agitation the time required for our silvered resin to kill and/or remove all bacteria may be long, with fair agitation the time is reduced to a reasonable amount and with good agitation the bacteria are killed and/or removed in an extremely short period of time.

While silver is the preferred metal as indicated in the foregoing examples, other metals which exhibit the oligodynamic action toward bacteria may be used. Examples of these include copper, gold, platinum, iridium, manganese, etc. The choice of the oligodynamic metal is controlled by the efficiency of a particular metal and by its cost. Since silver is very effective for this purpose and since its cost is not prohibitive in view of the high activity which we obtain, its use will be preferred in most instances.

Preparation of anion resin "A"

| | Parts |
|---|---|
| Urea | 24 |
| Guanidine nitrate | 26 |
| Formalin (37% formaldehyde in water) | 98 |
| Water | 6.3 |
| Water | 61 |

The water, formalin and soda ash are charged into a kettle, preferably glass-lined and equipped with a reflux condenser and an agitator. The urea and guanidine nitrate are then added and the resulting mixture is heated to the reflux point and maintained at this point for about 1-6 hours. During this operation the mixture is thoroughly agitated. This mixture is transferred to a suitable vessel, preferably glass-lined, and heated to about 90° C. To this, with vigorous agitation, about 3.6 parts of hydrochloric acid (specific gravity 1.19) in about 6.1 parts of water are added gradually and the material is then cooled as quickly as possible to about 70° C., thereby gelling the material. The gelled material should be further cooled, optionally by removing it from the vessel, breaking up into small blocks and spreading out on trays. The resulting material is ground to any desired fineness, e. g., a size that will pass 8 mesh.

The ground gel is distributed evenly on trays, preferably glass-lined, and these trays are placed in a suitable drier. The temperature is raised to about 50° C. and maintained at that point for about 5-6 hours. The temperature is then raised about 10° every half hour until about 100° C. is reached and the temperature is maintained at this point for about 2 hours. The resin is ground and screened to about 20-40 mesh.

In place of part or all of resin "A" other anion active materials may be substituted. Among these are the aldehyde condensation products of m-phenylene diamine, biguanide, guanyl urea, substituted guanidines such as methyl guanidine, substituted biguanides such as phenyl biguanide, polyamines preferably the polyethylene polyamines, etc. Such condensation products are preferably formaldehyde condensation products although other aldehyde condensation products may be used if desired. Examples of other aldehydes are acetaldehyde, furfural, acrolein, benzaldehyde, etc. The active resins such as those prepared from guanidine, guanyl urea, biguanide and other materials which do not form sufficiently insoluble condensation products with formaldehyde for most practical purposes are preferably insolubilized with suitable formaldehyde reactive materials, e. g., urea, thiourea, the amino-triazines (especially melamine and the guanamines which react with formaldehyde to produce insoluble products) etc. The anion active resins prepared from guanidine, guanyl urea, biguanide etc., may be prepared in the same general manner as resin "A." Usually it is convenient to use the salts of the bases but the free bases may also be used. Examples of suitable salts for use in the preparation of anion active resins are guanidine carbonate, guanidine sulfate, biguanide sulfate, biguanide nitrate, guanyl urea sulfate, guanyl urea nitrate, guanyl urea carbonate, etc. U. S. Patents Nos. 2,251,234 and 2,285,750 described methods of preparing many anion active resins of the aforementioned types.

The anion active resins are activated before the silvering process by treatment with a solution of sodium carbonate, caustic soda, potassium carbonate, potassium hydroxide, organic bases and the like. The resin is washed free of alkali after the activating treatment. Furthermore, if desired, the anion active resins may be activated again after the silvering process.

We have previously found that anion active resins remove a high proportion of bacteria possessing a negative electric charge from a fluid medium. However, the anion active resin apparently removes the bacteria from the water by some kind of attraction and it does not actually kill the bacteria. This is described and claimed in the copending application of Robert Bowling Barnes, Serial No. 457,524 filed September 5, 1942 now abandoned. In accordance with the present invention, the bacteria are removed from the water and they are actually killed by the combined action of the resin and silver or other oligodynamic metal. Since we obtain the combined action of the resin and silver, our silvered resins are far more efficient in removing bacteria from a fluid medium than either the silvered sand previously proposed or the anion active resin alone.

Our silvered resins may be employed in the form of beds through which relatively large volumes of fluids to be purified may be passed. On the other hand, our resins may be employed in tablet form or even in powdered form to purify small volumes of liquids. If the resin be used in powdered form, it will probably be found to be advantageous to package it in known quantities so that the proper amount may be used to purify any particular amount of fluid.

Our silvered resins may also be mixed with a suitable plastic molding composition and molded into various vessels such as tumblers, pitchers and the like. The molded vessels containing our silvered resins kill the bacteria in fluids which remain in the vessels for even a short period of time. Among the plastic materials into which our resins may be incorporated, the following are given by way of example: phenol-formaldehyde resins, urea-formaldehyde resins, aminotriazine-aldehyde resins (especially the melamine-formaldehyde resins), dicyandiamide-formaldehyde resins, polystyrene, etc.

Another form in which our silvered resins may be used is admixed with a molding composition and molded into conduits or into a thick, comb-like object. The comb-like molding may be employed for purifying a relatively large volume of liquid, whereas the conduit may be used for continuously purifying a stream of liquid flowing through it. Such conduits may also be useful in soda fountains and beer dispensers. In either of these instances the use of such a conduit would eliminate the difficulty, often encountered, due to the tendency of the various microorganisms to grow in the conduit system. Molded or shaped articles containing our silvered resins are described and claimed in our copending application Serial No. 461,902, filed October 13, 1942.

Our silvered resins may also be used in lacquers or other coating compositions. Thus, for example, they may be mixed with a nitrocellulose lacquer and applied in any suitable manner, as for example, by means of a spray, to various surfaces.

It would be difficult to mold canteens, bottles and the like from resinous materials but the inside surface could be coated with a lacquer containing one of our silvered resins. In this way a germicidal surface would be exposed to liquids contained in the vessels. Similarly, our silvered resins could be incorporated in varnishes, paints or enamels containing drying oils or drying oil modified alkyd resins. Our silvered resins may also be incorporated in baking finishes such as those comprising alkylated urea-formaldehyde resins (e. g., a butylated urea-formaldehyde resin), alkylated aminotriazine-aldehyde resins (e. g., a butylated melamine-formaldehyde resin). Our silvered resins may also be incorporated in any other desired coating compositions containing natural or synthetic resins, e. g. cumarone and/or indene polymers, methyl methacrylate polymers (as well as polymers of other methacrylic acid esters and of acrylic acid esters), polymers of styrene and its homologs, ethyl cellulose, cellulose acetate (and other ethers and esters of cellulose), natural and synthetic rubbers, polymers of vinyl acetate and vinyl chloride, manilla resin, kauri resin, ester gum, rosin modified phenolic resins, terpene maleic acid polyesters, terpene-fumaric acid polyesters, etc. Such coating compositions may contain in addition to our silvered resin suitable dyes, pigments or lakes, as well as the customary plasticizers and solvents employed in preparing coating compositions. The coating compositions may also be applied in the form of aqueous emulsions and our silvered resins may be in either the internal or external phase.

Our lacquers containing the silvered anion active resins are useful not only in coating the surface of containers but also in coating many objects where it is desirable that the exposed surface have germicidal properties. Some of our coating compositions may be used in surgical operations in order to protect the surface of the skin near the incision and thereby preserve it in an aseptic condition.

Coating compositions and our silvered resins per se are described and claimed in our copending application Serial No. 461,900 filed October 13, 1942.

Our silvered resins are useful in killing bacteria in a wide variety of fluids. Thus, milk, beer, wine and other beverages may be purified by contacting them with one of our silvered resins. Tablets of our bactericidal resins would be especially useful to men in the armed forces since they could easily drop one or more tablets of the resin into a canteen or glass full of water and after a few minutes drink water which would otherwise be extremely dangerous. As a matter of fact, the army has for many years been searching for a solution to the drinking water problem of the soldiers in the field where the water may be polluted with bacteria not only by natural causes but also by action of the enemy.

Obviously, many modifications and variations in the processes and compositions described above may be made without departing from the spirit and scope of the invention as defined in the appended claims.

We claim:

1. A process of destroying germs in a fluid medium which comprises treating a fluid medium containing germs with an anion active resin capable of absorbing an acid from a liquid having an oligodynamic metal precipitated thereon and bound therewith.

2. A process of killing bacteria in a fluid medium which comprises treating a fluid medium containing bacteria with an anion active resin capable of absorbing an acid from a liquid having silver precipitated thereon and bound therewith.

3. A process of killing bacteria which comprises contacting an aqueous medium containing bacteria with an anion active resin which is an insolubilized formaldehyde condensation product of a substance containing the group $$-NH-\underset{\underset{NH}{\|}}{C}-NH-$$

and having silver precipitated on and bound with said resin.

4. A process of destroying bacterial in water which comprises agitating water containing bacterial with an anion active resin which is an insolubilized formaldehyde condensation product of guanidine and which has silver precipitated thereon and bound therewith.

ROBERT BOWLING BARNES.
GARNET PHILIP HAM.

REFERENCES CITED

The following references are of record in the file of this patent:

UNITED STATES PATENTS

| Number | Name | Date |
|---|---|---|
| 2,066,271 | Irwin | Dec. 29, 1936 |
| 2,251,234 | Swain | July 29, 1941 |
| 2,285,750 | Swain | June 9, 1942 |
| 1,642,089 | Schreier | Sept. 13, 1927 |
| 1,988,246 | Krause | Jan. 15, 1935 |
| 2,008,131 | Dieck | July 16, 1935 |
| 1,978,447 | Austerweil et al. | Oct. 30, 1934 |
| 2,198,378 | Ellis | Apr. 23, 1940 |

FOREIGN PATENTS

| Number | Country | Date |
|---|---|---|
| 427,199 | Great Britain | Apr. 17, 1935 |